United States Patent
O'Neill et al.

(10) Patent No.: US 10,263,283 B2
(45) Date of Patent: Apr. 16, 2019

(54) ELECTROLYTE FORMULATIONS

(71) Applicant: Wildcat Discovery Technologies, Inc., San Diego, CA (US)

(72) Inventors: Cory O'Neill, San Diego, CA (US); Deidre Strand, San Diego, CA (US)

(73) Assignee: Wildcat Discovery Technologies, Inc, San Diego, CA (US)

(*) Notice: Subject to any disclaimer, the term of this patent is extended or adjusted under 35 U.S.C. 154(b) by 0 days.

(21) Appl. No.: 14/609,161

(22) Filed: Jan. 29, 2015

(65) Prior Publication Data

US 2015/0214577 A1 Jul. 30, 2015

Related U.S. Application Data

(60) Provisional application No. 61/933,820, filed on Jan. 30, 2014.

(51) Int. Cl.
*H01M 10/05* (2010.01)
*H01M 10/0567* (2010.01)
*H01M 10/0569* (2010.01)
*H01M 10/052* (2010.01)

(52) U.S. Cl.
CPC ... *H01M 10/0567* (2013.01); *H01M 10/0569* (2013.01); *H01M 10/052* (2013.01); *H01M 2300/0028* (2013.01); *H01M 2300/0034* (2013.01)

(58) Field of Classification Search
CPC .......... H01M 10/0567; H01M 10/052; H01M 10/0525; H01M 10/0569; H01M 10/056; H01M 10/4235; H01M 4/0445; H01M 4/133; H01M 4/1393
See application file for complete search history.

(56) References Cited

U.S. PATENT DOCUMENTS

| | | | |
|---|---|---|---|
| 3,433,679 A | 3/1969 | Johnson et al. | |
| 4,740,437 A | 4/1988 | Fujii et al. | |
| 5,691,081 A | 11/1997 | Krause et al. | |
| 6,060,184 A | 5/2000 | Gan et al. | |
| 6,136,477 A | 10/2000 | Gan et al. | |
| 6,403,256 B1 | 6/2002 | Gan et al. | |
| 7,172,834 B1 * | 2/2007 | Jow | H01M 10/0525 252/519.2 |
| 7,358,012 B2 | 4/2008 | Mikhaylik | |
| 7,732,093 B2 | 6/2010 | Xiao et al. | |
| 8,795,903 B2 | 8/2014 | Smart et al. | |
| 2005/0106470 A1 | 5/2005 | Yoon et al. | |

(Continued)

OTHER PUBLICATIONS

Azimi, Nasim et al., "Fluorinated Electrolytes for Li—S Battery: Suppressing the Self-Discharge with an Electrolyte Containing Fluoroether Solvent". Journal of the Electrochemical Society, 162 (1) A64-A68 (2015).

(Continued)

*Primary Examiner* — Ula C Ruddock
*Assistant Examiner* — Tony S Chuo
(74) *Attorney, Agent, or Firm* — Corridor Law Group, P.C.

(57) ABSTRACT

An electrolyte formulation including additive compounds, additive salts, or combinations thereof to improve both low temperature and high temperature performance of lithium ion batteries as compared to conventional electrolytes. Some of these embodiments further include solvents in the electrolyte solution.

10 Claims, 2 Drawing Sheets

(56) References Cited

U.S. PATENT DOCUMENTS

| | | | | |
|---|---|---|---|---|
| 2012/0100417 A1* | 4/2012 | Ramprasad | ......... | H01M 10/052 |
| | | | | 429/163 |
| 2013/0108930 A1 | 5/2013 | Patterson et al. | | |
| 2013/0164637 A1 | 6/2013 | Lee et al. | | |
| 2013/0209915 A1* | 8/2013 | Hirashita | ............ | H01M 10/052 |
| | | | | 429/498 |
| 2013/0260229 A1* | 10/2013 | Uzun | .................... | H01M 6/164 |
| | | | | 429/200 |
| 2013/0337347 A1* | 12/2013 | Pol | ........................ | H01M 4/583 |
| | | | | 429/341 |
| 2014/0170459 A1 | 6/2014 | Wang et al. | | |

OTHER PUBLICATIONS

Kim, Hyung Sun et al., "The Cycling Performances of Lithium-Sulfer Batteries in TEGDME/DOL containing LiNO3 Additive". Ionics 19:1795-1802 (2013).

* cited by examiner

ELECTROLYTE FORMULATIONS

CROSS REFERENCE TO RELATED APPLICATIONS

This application claims priority to and the benefit of U.S. Provisional Application No. 61/933,820 filed Jan. 30, 2014 entitled "Electrolyte Formulations," which application is incorporated herein by reference in its entirety.

BACKGROUND OF THE INVENTION

The present invention is in the field of battery technology and, more particularly, electrolyte formulations that enable both low temperature and high temperature operation of lithium ion batteries.

Lithium ion batteries enjoy relatively widespread use, but to some extent their use is limited by the properties of existing lithium ion technology. For example, certain applications for lithium ion batteries require wide operating temperature ranges. For some applications, it is desired that lithium ion batteries operate at temperatures as low as −40 degrees Celsius and in other applications it is desired that lithium ion batteries operate at temperatures as high as 50 degrees Celsius. Indeed, some lithium ion batteries may need to be capable of operating across this wide temperature range.

At low temperatures, lithium ion batteries can exhibit a diminished power capability as compared to their power capability at room temperature. This diminished power capability may be explained by one or more factors, or a combination thereof. Namely, the power capability of lithium ion batteries is diminished at low temperature due to: (i) an increase in viscosity of the electrolyte resulting in slower lithium ion diffusion; (ii) a decrease in conductivity of the electrolyte; (iii) a decrease in conductivity of the solid electrolyte interphase (SEI) on the anode; and (iv) a decrease in the diffusion rate of lithium ions through the electrode materials, especially the anode.

Past attempts to address the problem of diminished power capability at low temperature generally consist of adding solvents with very low melting points to the electrolyte formulation. The intent behind adding such solvents is to keep the formulation from freezing or otherwise having reduced viscosity at low temperature. However, these solvents tend to be detrimental to high temperature cycle life.

Thus, there exists a need for an electrolyte formulation for a lithium ion battery that mitigates the decrease in power capability at low operating temperature yet has high temperature cycle life comparable to, or better than, conventional electrolytes.

These and other challenges can be addressed by certain embodiments of the invention described herein.

BRIEF SUMMARY OF THE INVENTION

Embodiments of the present invention provide an electrolyte solution having a first lithium salt, an organic solvent other than a carbonate, and an additive. The additive can include a fluorine containing electron rich species, a second lithium salt including an oxidizing anion, or combinations thereof.

In some embodiments, the organic solvent is dimethoxyethane, propyl propanoate, or 1,1,2,2-tetrafluoro-3-(1,1,2,2-tetrafluoroethoxy)propane.

In some embodiments, the fluorine containing electron rich species is tris-(2,2,2-trifluoroethyl)phosphite or 2,2,2-trifluoroethyl piperidine-1-carboxylate.

In some embodiments, the second lithium salt is lithium nitrate or lithium oxalyldifluoroborate.

Embodiments of the present invention provide electrolyte formulations for lithium ion batteries that mitigate diminished power capability at low operating temperature and preserve cycle life at high operating temperatures. Also included are methods of forming and operating such batteries.

Embodiments of the present invention provide electrolyte formulations including additive compounds, additive salts, or combinations thereof to improve both low temperature and high temperature performance of lithium ion batteries as compared to conventional electrolytes. Some of these embodiments further include solvents in the electrolyte solution.

DETAILED DESCRIPTION OF THE INVENTION

Figure 1:
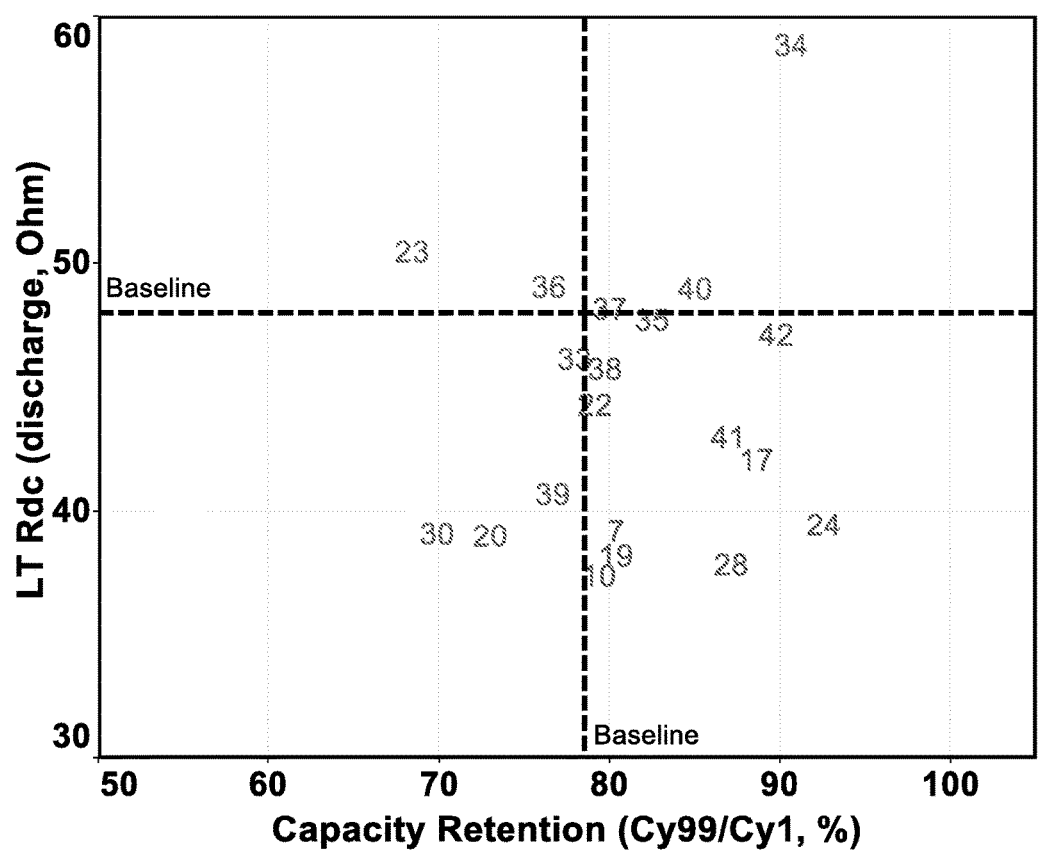
FIG. 1 depicts the results of electrochemical characterization of certain embodiments of the invention at low and high operating temperatures. The cathode is formulated from $LiFePO_4$ and the anode from soft carbon.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

In some embodiments disclosed herein, electrolyte solutions formulated to contain specific additive types and/or solvent types can reduce losses in power performance in lithium ion batteries operated at low temperatures. Advantageously, the chosen additives and solvents generally retain, or do not substantially diminish, high temperature cycle life when compared to lithium ion batteries using conventional, carbonate-based electrolyte formulations.

Liquid electrolyte solutions conduct lithium ions between the electrodes in an electrochemical cell. Conventionally formulated liquid electrolyte solutions for lithium ion batteries typically include one or more lithium salts, such as $LiPF_6$, $LiBF_4$ or $LiClO_4$, and a solvent. The solvent is typically an organic solvent, such as ethylene carbonate (referred to herein as "EC"), dimethyl carbonate (referred to herein as "DMC"), diethyl carbonate (referred to herein as "DEC"), ethyl methyl carbonate (referred to herein as "EMC") or combinations thereof. These as similar solvents can be referred to as "carbonate solvents." The organic solvents and lithium salt solutions decompose on the initial charge cycle and form the SEI referred to above. The SEI is electrically insulating but allows ionic conductivity. The formation of the SEI is desirable, but further thickening of the SEI can limit battery performance. Within a temperature range of from about 0 degrees Celsius to about 40 degrees Celsius, conventional electrolytes can perform with generally acceptable power capability. Indeed, although lithium ion batteries can perform well in terms of power capability at elevated temperatures, the cycle life is frequently diminished as a result of operation at elevated temperatures.

At lower temperatures, the presence of the SEI can have a profound effect on the power capability of the battery because the temperature dependence of the SEI ionic conductivity can be more extreme than that of the liquid electrolyte. In certain embodiments, additives disclosed herein may improve low temperature power performance by preventing the formation of thick, insulating SEI layers on the anode. These types of SEI layers can have poor lithium ion conductivity at low temperatures. In certain embodiments, additives disclosed herein may improve low temperature power performance by changing the composition of the SEI, such that the ionic conductivity has less extreme temperature dependence.

Low temperature power performance can be evaluated by measuring direct current (DC) cell resistance ($R_{DC}$). Generally, a lower $R_{DC}$ allows higher power performance in lithium ion batteries. $R_{DC}$ is derived from pulsed power testing, and the testing can be done at a variety of operating temperatures.

Briefly, $R_{DC}$ is calculated by measuring the difference in voltage between the open circuit potential ($V_{OCV}$) and at the end of a 10 second constant current discharge pulse ($V_{CC}$), and dividing by the pulse current. In the measurement herein, $R_{DC}=(V_{CC}-V_{OCV})/I_{CC}$, where $V_{CC}$ is the voltage at the end of the OCV step corresponding to the same state of charge (SoC) where the pulse started, and $I_{CC}$ is the current on the constant current pulse. Generally, the testing procedure is: (1) discharge at room temperature to a desired state of charge; (2) lower the temperature and allow the cell to equilibrate; (3) hold at open circuit potential for some time; (4) constant current pulse at 10 C for 10 seconds; and (5) measure Vcc at end of pulse. Because RDC is a function of SoC, all measurements are made at 50% SoC for comparison.

Electrolyte solutions containing certain additives disclosed herein demonstrate lower direct current cell resistance as compared to conventional electrolyte solutions. The additives that demonstrate lower direct current cell resistance have at least one of the following characteristics: fluorine containing, electron rich species; or lithium salts that include an oxidizing anion.

For example, fluorine containing, electron rich additives include, but are not limited to, tris-(2,2,2-trifluoroethyl) phosphite (referred to herein as "TTFP") and 2,2,2-trifluoroethyl piperidine-1-carboxylate (referred to herein as F-Carbamate). Preferred concentration for these types of electron rich additives are less than 5% by weight. More preferred concentration is less than 2% by weight in the formulation. Further, examples of lithium salts that include an oxidizing anion include, but are not limited to, lithium nitrate ($LiNO_3$) and lithium oxalyldifluoroborate (referred to herein as "LiODFB"). These lithium salts are added as a partial replacement for the $LiPF_6$ primary salt. Preferred concentration range for these salts are less than 0.4M LiX/0.6M $LiPF_6$. More preferred concentration range is 0.1M LiX/0.9M $LiPF_6$ to 0.2M LiX/0.8M $LiPF_6$, where X refers to the oxidizing anion. Still further, electrolyte solutions can be formulated with combinations of these additives.

Without being bound to a particular hypothesis, theory, or proposed mechanism of action, the classes of additives chosen are expected to have beneficial effects on the SEI layer of the anode. The additives can reduce or prevent the formation of excessive SEI layers or SEI layers whose thickness presents an undesirable decrease in lithium ionic conductivity at low temperatures.

Advantageously, certain additives demonstrate improved performance on a variety of anode types paired with a conventional lithium cathode. For example, the direct current cell resistance was improved compared to a conventional electrolyte for a $LiFePO_4$ cathode paired in a lithium ion cell with an anode formed from soft carbon, and the direct current cell resistance was improved compared to a conventional electrolyte for a $LiFePO_4$ cathode paired in a lithium ion cell with an anode formed from graphite.

A further advantage of certain additives disclosed herein is improved electrolyte performance at high operating temperatures. As discussed herein, electrolyte solutions can decompose at high operating temperatures. One proposed mechanism through which the additives achieve improvements in high operating temperature is by mitigating the reactivity of $PF_5$. $PF_5$ is a product of the decomposition of $LiPF_6$ due to moisture or reaction with protic species such as water. $PF_5$ is a strong, reactive Lewis acid and can accelerate the decomposition of conventional organic solvents. Additives disclosed herein can reduce the formation of $PF_5$ and/or can reduce the reactivity (or the reactive effects) of $PF_5$ on the components of the electrolyte solution.

TTFP is an electron rich species that can decrease the reactivity of $PF_5$. Degradation of $LiPF_6$ to form $PF_5$, which subsequently reacts to form a comparatively thick SEI layer. This thick SEI layer can consist of high levels of LiF, which would in turn negatively affect low temperature performance. The TTFP can be beneficial at high temperatures as the thermal degradation of $LiPF_6$ ordinarily forms higher levels of $PF_5$. Again, the reactivity of the $PF_5$ can be mitigated by the TTFP additive. Similarly, 2,2,2-trifluoroethyl piperidine-1-carboxylate is an electron rich species and can provide the same benefits as TTFP.

$LiNO_3$ can benefit low temperature and high temperature performance in a number of ways. The degradation of $LiPF_6$ (as described above) can be harmful to both high and low temperature performance due to degradation to $PF_5$. Replacement of a portion of the $LiPF_6$ with $LiNO_3$ provides lithium ions necessary for battery operation while decreasing the potential for formation of reactive $PF_5$. That is, with less $LiPF_6$ in the system less reactive $PF_5$ will be formed. Further, the use of a $LiNO_3$ with silicon based anodes results in a higher ratio of flexible organic fluorine species in the SEI layer relative to brittle inorganic fluorine species. The more flexible organic species can help to enhance the conductivity at low temperature.

Lithium oxalyldifluoroborate (LiODFB) can also benefit performance in multiple ways. Similar to the $LiNO_3$, the LiODFB can be used to partially replace the $LiPF_6$ which translates to lower amounts of destructive $PF_5$. The LiODFB is also an electron rich species, which may provide some of the same benefits as TTFP in reducing the reactivity of the $PF_5$.

With further regard to the composition of the electrolyte solution, according to certain embodiments the electrolyte solution can contain solvents not typically found in conventional electrolyte solution. The presence of such solvents, and in particular the presence of such solvents in combination with the additives disclosed herein, can provide desirable high temperature performance. Solvents such as dimethoxyethane (referred to herein as "DME"), propyl propanoate (referred to herein as "PP"), 1,1,2,2-tetrafluoro-3-(1,1,2,2-tetrafluoroethoxy)propane (referred to herein as "FEP"), and combinations thereof improve high temperature performance of the electrolyte solution disclosed herein.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Battery Cell Assembly.

Battery cells were formed in a high purity argon filled glove box (M-Braun, $O_2$ and humidity content <0.1 ppm). $LiFePO_4$ was used as the cathode material. The anode was formed from either graphite or soft carbon as identified in the tables and figures disclosed herein. Each battery cell includes the composite cathode film, a polypropylene separator, and composite anode film. Electrolyte components were formulated as identified in the tables and figures disclosed herein and added to the battery cell.

Example 1—Formation

The electrochemical cell formation cycle for the cells containing cathodes formed from $LiFePO_4$ and anodes formed from soft carbon was as follows: a 10 hour hold at open circuit voltage (OCV), followed by a C/10 charge to 3.65V with a constant voltage (CV) hold to C/50, and then a C/10 discharge to 2.0V. The electrochemical cell formation cycle for the cells containing cathodes formed from $LiFePO_4$ and anodes formed from graphite was as follows: a 10 hour hold at open circuit voltage (OCV), followed by a C/10 charge to 3.7V with a constant voltage (CV) hold to C/50, and then a C/10 discharge to 2.5V.

Example 2—Low Temperature Testing

Following the formation cycle, cells were recharged at room temperature to a 50% state of charge. Cells were held in this state of charge for 10 hours at low temperature, in this case −10 degrees Celsius. The voltage data points for the direct current cell resistance calculation were obtained by a 10 C constant current discharge for 10 seconds followed by a 40 second rest period, and then a 10 C constant current charge for 10 seconds followed by an additional 40 second rest period.

Example 3—High Temperature Testing

Following the formation cycle, cells were recharged at room temperature to a 50% state of charge. Cells were held at this state for 4 hours at high temperature, in this case 45 degrees Celsius. Cells with anodes formed from soft carbon were charged from this state to 3.65V at a rate of 1 C followed by a 15 minute rest period, and then discharged to 2.0V at a rate of 2 C followed by another 15 minute rest period. This charge/discharge cycle was continued, including the 15 minute rest periods, for 100 cycles. Cells with anodes formed from graphite were charged from this state to 3.7V at a rate of 1 C followed by a 15 minute rest period, and then discharged to 2.5V at a rate of 2 C followed by another 15 minute rest period. This charge/discharge cycle was continued, including the 15 minute rest periods, for 100 cycles.

Results

Figure 2:
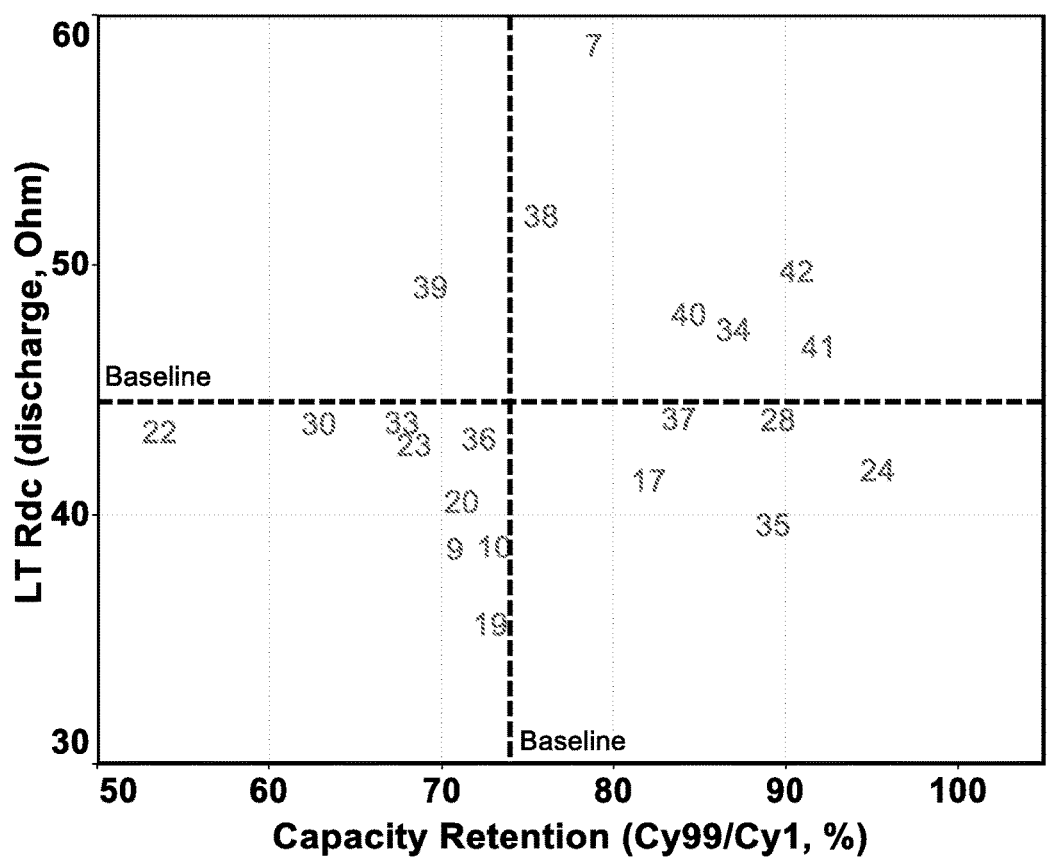
FIG. 2 depicts the results of electrochemical characterization of certain embodiments of the invention at low and high operating temperatures. The cathode is formulated from $LiFePO_4$ and the anode from graphite.

FIG. 1 depicts the results of the low temperature and high temperature tests for cells formed from a $LiFePO_4$ cathode material and a soft carbon anode material as compared to control cells. FIG. 2 depicts the results of the low temperature and high temperature tests for cells formed from a $LiFePO_4$ cathode material and a graphite anode material as compared to control cells. Table 1 identifies the different formulations in both FIG. 1 and FIG. 2 by identification number ("ID#").

TABLE 1

Formulation Identities For FIG. 1 And FIG. 2

| ID# | Electrolyte Solvents and Solvent Ratio | Additive 1 (0.5 wt %) | Additive 2 (2.0 wt %) | Salt (M) |
|---|---|---|---|---|
| 1 | 3:3:4 EC:EMC:DMC | VC | | $LiPF_6$ |
| 2 | 3:3:4 EC:EMC:DEC | VC | | $LiPF_6$ |
| 3 | 3:7 EC:DGDE | VC | | $LiPF_6$ |
| 4 | 3:4:3 EC:DEC:DGDE | VC | | $LiPF_6$ |
| 5 | 3:6.5:0.5 EC:DGDE:FB | VC | | $LiPF_6$ |
| 6 | 3:4:2.5:0.5 EC:DEC:DGDE:FB | VC | | $LiPF_6$ |
| 7 | 3:2:4:1 EC:EMC:DEC:FEP | VC | | $LiPF_6$ |
| 8 | 3:1:4:2 EC:EMC:DEC:FEP | VC | | $LiPF_6$ |
| 9 | 3:7 EC:PP | VC | | $LiPF_6$ |
| 10 | 3:4:3 EC:DEC:PP | VC | | $LiPF_6$ |
| 11 | 2:4:4 EC:EMC:DMC | VC | | $LiPF_6$ |
| 12 | 2:4:4 EC:EMC:DMC | VC | $NaClO_4$ | $LiPF_6$ |
| 13 | 2:4:4 EC:EMC:DMC | VC | $Na_2CO_3$ | $LiPF_6$ |
| 14 | 2:4:4 EC:EMC:DMC | VC | $K_2CO_3$ | $LiPF_6$ |
| 15 | 2:4:4 EC:EMC:DMC | VC | LiF | $LiPF_6$ |
| 16 | 2:4:4 EC:EMC:DMC | VC | TPFPB | $LiPF_6$ |
| 17 | 2:4:4 EC:EMC:DMC | VC | TTFP | $LiPF_6$ |
| 18 | 2:4:4 EC:EMC:DMC | VC | HMP | $LiPF_6$ |
| 19 | 2:4:4 EC:EMC:DMC | VC | F-Carbamate | $LiPF_6$ |
| 20 | 2:4:4 EC:EMC:DMC | VC | | 0.8 $LiPF_6$ 0.2 $LiBF_4$ |
| 21 | 2:4:4 EC:EMC:DMC | VC | | 0.2 $LiPF_6$ 0.8 $LiBF_4$ |

TABLE 1-continued

Formulation Identities For FIG. 1 And FIG. 2

| ID# | Electrolyte Solvents and Solvent Ratio | Additive 1 (0.5 wt %) | Additive 2 (2.0 wt %) | Salt (M) |
|---|---|---|---|---|
| 22 | 2:4:4 EC:EMC:DMC | VC | | 0.8 LiPF$_6$ 0.2 LiTFSI |
| 23 | 2:4:4 EC:EMC:DMC | VC | | 0.2 LiPF$_6$ 0.8 LiTFSI |
| 24 | 2:4:4 EC:EMC:DMC | VC | | 0.8 LiPF$_6$ 0.2 LiNO$_3$ |
| 25 | 2:4:4 EC:EMC:DMC | VC | | 0.2 LiPF$_6$ 0.8 LiNO$_3$ |
| 26 | 2:4:4 EC:EMC:DMC | VC | | 0.8 LiPF$_6$ 0.2 LiBoB |
| 27 | 2:4:4 EC:EMC:DMC | VC | | 0.2 LiPF$_6$ 0.8 LiBoB |
| 28 | 2:4:4 EC:EMC:DMC | VC | | 0.8 LiPF$_6$ 0.2 LiODFB |
| 29 | 2:4:4 EC:EMC:DMC | VC | | 0.2 LiPF$_6$ 0.8 LiPF$_6$ |
| 30 | 2:4:4 EC:EMC:DMC | VC | | 0.8 LiPF$_6$ 0.2 LiDFP |
| 31 | 2:4:4 EC:EMC:DMC | VC | | 0.2 LiPF$_6$ 0.8 LiDFP |
| 32 | 3:3:4:0.5 EC:EMC:DEC:FEP | VC | | LiPF$_6$ |
| 33 | 2:3:4:1 EC:EMC:DMC:PP | VC | | 0.8 LiPF$_6$ 0.2 LiODFB |
| 34 | 2:3:4:1 EC:EMC:DMC:PP | VC | | 0.8 LiPF$_6$ 0.2 LiNO$_3$ |
| 35 | 2:3:4:1 EC:EMC:DMC:PP | VC | | 0.9 LiPF$_6$ 0.1 LiNO$_3$ |
| 36 | 2:3:4:1 EC:EMC:DMC:FEP | VC | | 0.8 LiPF$_6$ 0.2 LiODFB |
| 37 | 2:3:4:1 EC:EMC:DMC:FEP | VC | F-Carbamate | 0.8 LiPF$_6$ 0.2 LiODFB |
| 38 | 2:3:4:1 EC:EMC:DMC:FEP | VC | F-Carbamate | 0.8 LiPF$_6$ 0.2 LiNO$_3$ |
| 39 | 2:3:4:1 EC:EMC:DMC:FEP | VC | F-Carbamate | 0.8 LiPF$_6$ 0.1 LiNO$_3$ 0.1 LiBF$_4$ |
| 40 | 2:3:4:1 EC:EMC:DMC:FEP | VC | F-Carbamate (at 1.0 wt %) | 0.8 LiPF$_6$ 0.2 LiNO$_3$ |
| 41 | 2:3:4:1 EC:EMC:DMC:FEP | VC | TTFP | 0.8 LiPF$_6$ 0.2 LiODFB |
| 42 | 2:3:4:1 EC:EMC:DMC:FEP | VC | TTFP | 0.8 LiPF$_6$ 0.2 LiNO$_3$ |

In Table 1, the solvents are abbreviated accordingly: EC is ethylene carbonate, DMC is dimethyl carbonate, DEC is diethyl carbonate, EMC is ethyl methyl carbonate, DGDE is diethylene glycol dimethyl ether, FB is fluorobenzene, DME is dimethoxyethane, PP is propyl propanoate, and FEP is 1,1,2,2-tetrafluoro-3-(1,1,2,2-tetrafluoroethoxy)propane. The respective ratios for these solvent combinations are presented.

Each of the formulations in Table 1 (and therefore in FIG. 1 and FIG. 2) included vinylene carbonate ("VC") as a first additive at 0.5 weight percent (by total weight of the solution). Many of the formulations included a second additive, which was typically included at 2.0 weight percent (except for formulation #40, where the second additive was included at 1.0 weight percent). The second additives are abbreviated accordingly: NaClO$_4$ is sodium perchlorate, Na$_2$CO$_3$ is sodium carbonate, K$_2$CO$_3$ is potassium carbonate, LiF is lithium fluoride, TPFPB is tris(pentafluorophenyl)borane, TTFP is tris-(2,2,2-trifluoroethyl)phosphite, HMP is hexamethyl phosphoramide, and F-Carbamate is 2,2,2-trifluoroethyl piperidine-1-carboxylate Baseline values refer to those values generated by evaluating control electrolyte formulations using the test methods described herein. For both anode types, the control electrolyte formulation for the low temperature testing was a 1M LiPF$_6$ lithium salt and conventional carbonate solvent mixture of EC:EMC:DMC in a 2:4:4 part ratio. For both anode types, the control electrolyte formulation for the high temperature testing was a 1M LiPF$_6$ lithium salt and conventional carbonate solvent mixture of EC:EMC:DMC in a 3:3:4 part ratio. In each case, formulations with results in the lower right quadrant (with respect to the intersection of the baseline value lines) of FIG. 1 or FIG. 2 exhibit desirable performance.

In some cases, the performance of some of the formulations of Table 1 is not pictured in FIG. 1 or FIG. 2. If a formulation ID# is not present in FIG. 1 or FIG. 2, that formulation did not exhibit the desired performance as described below.

Referring to FIG. 1, certain electrolyte formulations demonstrate a decreased direct current resistance at −10 degrees Celsius as well as increased capacity retention at 45 degrees Celsius relative to the baselines in a soft carbon anode cell. For example, electrolyte formulations containing certain additives disclosed herein result in a 10-19% decrease in direct current cell resistance at low temperature as compared to a carbonate electrolyte (EC/DMC/EMC) without the additives. Unexpectedly, the best additive formulations have direct current cell resistance values at low temperature similar to or less than an electrolyte formulation containing a solvent combination specifically designed for low temperature (EC/DME, where DME is dimethoxyethane). Yet, EC/DME does not perform well at high temperature and the best additive formulations do perform well at high temperature.

Referring to FIG. 2, certain electrolyte formulations show decreased direct current resistance at −10 degrees Celsius as well as increased capacity retention at 45 degrees Celsius relative to the baselines in a graphite anode cell. For example, electrolyte formulations containing certain additives disclosed herein result in a 7-12% decrease in direct current cell resistance at low temperature as compared to a carbonate electrolyte (EC/DMC/EMC) without the additives.

Table 2 presents specific values of direct current cell resistance at low temperature and capacity retention at 100 cycles at elevated temperature for control and advantageous formulations from FIGS. 1 and 2. Direct current cell resistance is in units of Ohms (Ω) and capacity retention is presented as the ratio of the capacity at the 100th cycle compared the 1st cycle expressed as a percentage. The battery tested to generate the results in Table 2 included a soft carbon anode.

TABLE 2

$R_{DC}$ at −10° C. and capacity retention at 45° C. for soft carbon anode

| Formulation | $R_{DC}$ (Ω) | Capacity Retention (% Cyc100/Cyc1) |
|---|---|---|
| Low Temp Control | | |
| EC/EMC/DMC 2/4/4 1M LiPF$_6$ 0.5% VC | 48.0 | 84.5 |
| High Temp Control | | |
| EC/EMC/DMC 3/3/4 1M LiPF$_6$ 0.5% VC | | 84.7 |

TABLE 2-continued $R_{DC}$ at −10° C. and capacity retention
at 45° C. for soft carbon anode

| Formulation | $R_{DC}$ (Ω) | Capacity Retention (% Cyc100/Cyc1) |
|---|---|---|
| EC/DME 2/8<br>1M LiPF$_6$<br>0.5% VC | 46.7 | 82.6 |
| EC/EMC/DMC 2/4/4<br>1M LiPF$_6$<br>0.5% VC<br>2% TTFP | 41.7 | 88.2 |
| EC/EMC/DMC 2/4/4<br>0.8M LiPF$_6$/0.2M LiNO$_3$<br>0.5% VC | 39.0 | 92.2 |
| EC/EMC/DMC 2/4/4<br>0.8M LiPF$_6$/0.2M LiODFB<br>0.5% VC | 37.4 | 86.7 |
| EC/EMC/DMC/FEP 2/3/4/1<br>0.8M LiPF$_6$/0.2M LiODFB<br>0.5% VC<br>2% TTFP | 42.6 | 86.5 |

Table 3 presents specific values of direct current cell resistance at low temperature and capacity retention at 100 cycles at elevated temperature for control and advantageous formulations from FIGS. 1 and 2. Direct current cell resistance is in units of Ohms (Ω) and capacity retention is presented as the ratio of the capacity at the 100th cycle compared the 1st cycle expressed as a percentage. The battery tested to generate the results in Table 2 included a graphite anode.

TABLE 3

$R_{DC}$ at −10° C. and capacity retention at 45° C. for graphite anode

| Formulation | $R_{DC}$ (Ω) | Capacity Retention (% Cyc100/Cyc1) |
|---|---|---|
| Low Temp Control | | |
| EC/EMC/DMC 2/4/4<br>1M LiPF$_6$<br>0.5% VC | 46.7 | 74.0 |
| High Temp Control | | |
| EC/EMC/DMC 3/3/4<br>1M LiPF$_6$<br>0.5% VC | | 74.1 |
| EC/EMC/DMC 2/4/4<br>1M LiPF$_6$<br>0.5% VC<br>2% TTFP | 41.0 | 83.3 |
| EC/EMC/DMC 2/4/4<br>0.8M LiPF$_6$/0.2M LiNO$_3$<br>0.5% VC | 41.4 | 94.0 |
| EC/EMC/DMC/PP 2/3/4/1<br>0.9M LiPF$_6$/0.1M LiNO$_3$<br>0.5% VC | 39.2 | 90.8 |

Concentration dependence was observed for the lithium nitrate additive.

Certain formulations disclosed herein mitigate diminished power capability at low operating temperature, and these additives can be formulated with certain solvents disclosed herein to preserve cycle life at high operating temperatures. The lower direct current resistance at low temperature of certain inventive formulations as compared to the control formulations demonstrates the improved power performance. Further, certain formulations disclosed herein prevent the formation of thick, insulating SEI layers on the anode. Such thick, insulating SEI layers can result in poor lithium ion conductivity at low temperatures. This effect was demonstrated on both soft carbon and graphite anodes operating in an ion intercalation battery. Still further, certain formulations also improved high temperature cycle life by mitigating the effects of LiPF$_6$ decomposition and subsequent reactivity of PF$_5$. The combination of additives and solvents disclosed herein and the resulting performance improvements are not found in the prior art.

For example, some references disclose the additive LiNO$_3$, typically in conjunction with lithium-sulfur electrodes. For example, both Azimi et al. *Journal of The Electrochemical Society*, 162 (1) A64-A68 (2015) and Kim et al. *Ionics* (2013) 19:1795-1802 disclose the promotion and formation of SEI layers in a lithium-sulfur battery. A similar effect on the SEI is expected in other lithium sulfur battery systems, such as those disclosed in U.S. Pat. No. 7,358,012. In contrast, the embodiments disclosed herein can reduce or prevent the formation of excessive SEI layers or SEI layers whose thickness presents an undesirable decrease in lithium ionic conductivity at low temperatures. The results disclosed herein are thus contrary to the results in the lithium sulfur systems of certain prior studies.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrolyte, comprising:
   a first lithium salt;
   an organic solvent; and
   an additive comprising 2,2,2-trifluoroethyl piperidine-1-carboxylate.

2. A battery comprising an anode, a cathode, and the electrolyte solution of claim 1.

3. The electrolyte of claim 1 further comprising a second lithium salt including an oxidizing anion.

4. The electrolyte of claim 3 wherein the second lithium salt is lithium nitrate.

5. The electrolyte of claim 3 wherein the second lithium salt is lithium oxalyldifluoroborate.

6. The electrolyte of claim 1 wherein the organic solvent comprises dimethoxyethane.

7. The electrolyte of claim 1 wherein the organic solvent comprises propyl propanoate.

8. The electrolyte of claim 1 wherein the organic solvent comprises dimethyl carbonate.

9. The electrolyte of claim 1 wherein the organic solvent comprises 1,1,2,2-tetrafluoro-3-(1,1,2,2-tetrafluoroethoxy)propane.

10. The electrolyte of claim 3 wherein the second lithium salt is LiBF$_4$.

* * * * *